April 20, 1937.       J. S. IRVING       2,077,931
BRAKE
Filed Dec. 6, 1934

INVENTOR.
JOHN SAMUEL IRVING
BY
ATTORNEY

Patented Apr. 20, 1937

2,077,931

UNITED STATES PATENT OFFICE 2,077,931

BRAKE

John Samuel Irving, Birmingham, England, assignor to Bendix Products Corporation, South Bend, Ind., a corporation of Indiana Application December 6, 1934, Serial No. 756,304
In Great Britain January 12, 1934

7 Claims. (Cl. 188—78)

This invention relates to brakes, and is illustrated as embodied in an internal expanding brake for an automobile wheel. An object of the invention is to provide a simple and effective actuator for such a brake, having greatly reduced friction.

In one desirable arrangement, the brake shoes or their equivalents are applied by a device moving at right angles to the plane of the brake and having a wedging action on the shoes, the parts preferably being provided with anti-friction means such as rollers.

Various features of novelty relate to the arrangement and mounting of the rollers, to the provision of a novel guide embracing the shoe ends and also carrying the applying device, and to other novel combinations of parts and desirable particular constructions which will be apparent from the following description of the illustrative embodiments shown in the accompanying drawing, in which.

In the illustrated arrangement, the brake comprises a rotatable drum 10, the open side of which is substantially closed by a support such as a backing plate 12, and within which are arranged brake shoes or equivalent friction parts 14 and 16. The shoes are applied by forcing them against the drum, against the resistance of a return spring 18, by the novel applying means described below.

Figure 1:
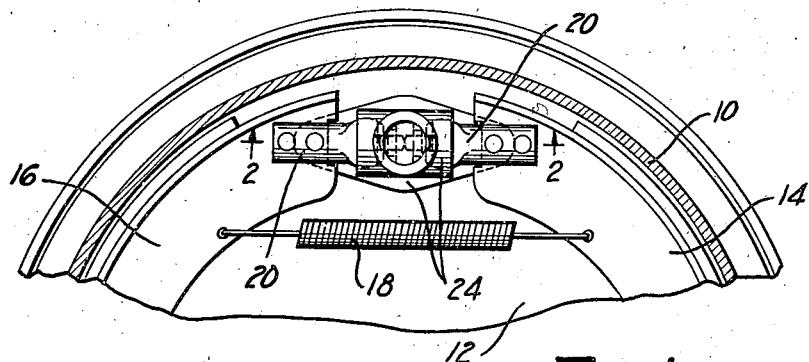
Figure 1 is a vertical section through the upper part of the brake, just inside the head of the brake drum, and showing the upper ends of the shoes in side elevation.
Figure 2:
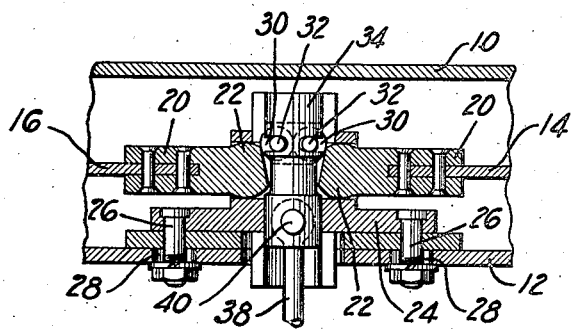
Figure 2 is a partial horizontal section therethrough on the line 2—2 of Figure 1.

In the arrangement of Figures 1 and 2, the shoes are provided at their ends with thrust fittings 20, having rounded portions 22 slidably guided in aligned bores in a guide 24 secured by means such as bolts 26 to the backing plate 12. The bolts 26 are shown passing through enlarged openings 28, so that the position of the guide 24 may be adjusted.

Fittings 20 are formed at their ends with inclined converging plane surfaces wedgingly engaged by rollers 30 having pivots 32 arranged in slots in an actuating member 34 guided in an opening in the face of guide 24 nearest the head of the brake drum. The member 34, with its rollers 30, is thus guided to move perpendicular to the backing plate, to wedge the shoes apart and apply the brake. Pivots 32 float in their slots, and rollers 30 are in rolling thrust engagement with each other.

The central part of member 34 is cut away, to clear the ends of fittings 20, and the lower portion in Figure 2 is guided in an opening in the base of the guide 24. This lower portion may be slotted to receive an eye in the end of a tension element such as a rod 38, to which it is shown connected by a pin or the like 40.

Figure 3:
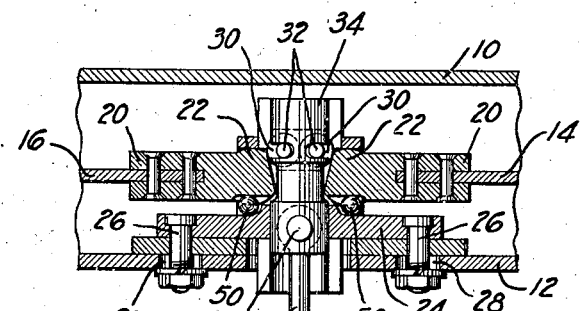
Figures 3 and 4 are similar sections, corresponding to Figure 2, but showing modifications.

The arrangement in Figure 3 is the same as that described above, except that the fittings 20 are grooved to embrace and have rolling engagement with anti-friction balls 50 rolling against the face of the base of guide 24.

Figure 4:
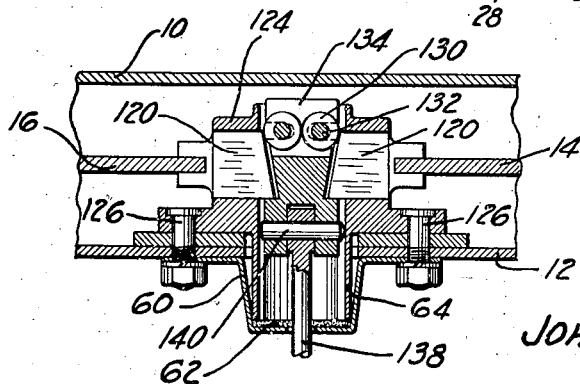

In Figure 4, fittings 120 on the shoes guided in bores in the guide 124 are wedgingly engaged by rollers 130 arranged in a slot in the end of an actuating device 134, and mounted on pins 132 driven through suitable openings in said device. A tension element 138 is connected to said device by means such as a pin 140.

In this arrangement, the bolts 126 holding the guide 124 also serve to hold a stamping 60 cupped to engage the backing plate and at the same time to compress a felt sealing washer 62 against the end of a boss 64 formed on the guide 124. The washer 62 embraces tension element 138 in sealing engagement therewith.

It will be seen that the rollers 30 or 130 not only minimize friction, since they roll on each other and also on the shoe ends, but also serve to balance the thrusts on the shoe ends by shifting laterally as may be necessary.

While several illustrative embodiments have been described in detail, it is not my intention to limit the scope of the invention to those particular embodiments, or otherwise than by the terms of the appended claims.

I claim:

1. A brake comprising a support having mounted thereon friction means having separable ends, a guide on said support having aligned openings guidingly embracing parts on said ends having inclined surfaces, and said guide having at right angles thereto another opening perpendicular to the support, and an applying device in said other opening comprising a pair of rollers in rolling engagement each with the other and one of the inclined surfaces respectively and operating means engaging parts of said rollers.

2. A brake comprising a support having mounted thereon friction means having separable ends provided with rounded thrust parts having inclined surfaces, a guide on said support having aligned openings guidingly embracing said parts and having at right angles thereto another opening perpendicular to the support, and an applying device in said other opening comprising a pair of rollers in rolling engagement each with the other and one of the inclined surfaces respectively and operating means engaging parts of said rollers.

3. A brake comprising a support having mounted thereon friction means having separable ends, a guide on said support having aligned openings guidingly embracing parts on said ends and having at right angles thereto another opening perpendicular to the backing plate, and an applying device in said other opening having means in wedging rolling engagement with said ends, together with anti-friction members between said separable ends and said guide taking the thrust of said device perpendicular to said support.

4. A brake comprising a support having mounted thereon friction means having separable ends provided with rounded thrust parts, a guide on said support having aligned openings guidingly embracing said parts and having at right angles thereto another opening perpendicular to the support, and an applying device in said other opening having means in wedging rolling engagement with said parts, together with anti-friction members between said parts and said guide taking the thrust of said device perpendicular to said support.

5. A brake applying device having mounted therein a pair of rollers in rolling engagement each with the other and with one of the two adjacent inclined ends of a brake friction device respectively.

6. A brake applying device having mounted therein a pair of rollers in rolling engagement with each other and adapted to have rolling engagement with the ends of a brake friction device, said rollers having pivots projecting axially therefrom and said device having slots floatingly receiving said pivots.

7. A brake comprising a support having mounted thereon a boss projecting through the support and formed with a bore perpendicular to the support and with aligned transverse bores, brake friction means having end parts guidingly embraced by said aligned bores, an applying device operatively engaging said end parts and arranged in said bore with an operating part extending therefrom, a seal for said operating part engaging the end of said boss, a stamping engaging and holding said seal and engaging the support, and fastenings securing the guide and support and stamping together.

JOHN SAMUEL IRVING.